Patented Feb. 6, 1951

2,540,209

UNITED STATES PATENT OFFICE 2,540,209

COPPER FUNGICIDAL COMPOSITIONS SAFENED WITH ZINC SULFITE

Alexander A. Nikitin, College Park, Ga., assignor to Tennessee Copper Company, New York, N. Y., a corporation of New Jersey No Drawing. Application February 18, 1948, Serial No. 9,321

8 Claims. (Cl. 167—14)

This invention relates to improvements in fungicidal and insecticidal compositions. The present application is a continuation in part of my prior application Serial No. 606,879 filed July 24, 1945, now abandoned.

The use of various forms of zinc in fungicidal and insecticidal compositions has been proposed heretofore. For example, U. S. Patent No. 2,051,910 proposes to use a complex copper-zinc silicate as a fungicide, the zinc being added to improve the physical properties of the silicate for this purpose. U. S. Patent No. 2,225,867 asserts that zinc oxide acts synergistically with copper oxide when the two are mixed and used for fungicidal purposes, whereas synergistic action is not obtained with other zinc compounds including zinc carbonate, zinc silicate and zinc oxalate. U. S. Patent No. 2,376,740 also proposes the use of basic zinc sulphate as a "safener" in calcium arsenate insecticides.

Apart from such physical and activating effects, zinc ion per se is beneficial for protection against pests. However, most zinc salts are not suitable for use in fungicidal or insecticidal compositions. Soluble zinc salts such as zinc sulphate cause a severe injury to foliage. This fact is recognized in Patent No. 2,376,740 and also in U. S. Patent No. 1,905,532 wherein zinc is proposed as an immunizing agent against certain forms of blight. In both cases the soluble zinc sulphate is accordingly converted to insoluble basic zinc sulphate by reaction with an excess of lime. Basic zinc salts such as basic zinc sulphate do not injure the plant, but on the other hand they are relatively ineffective as fungicides because they are so insoluble that they do not furnish the required amount of zinc ion.

It has been found that zinc sulphite is very beneficial when used on plants. In the first place, it eliminates the technical difficulties mentioned above since it can be used safely without preliminary treatment with lime, while it furnishes zinc ion upon oxidation into zinc sulphate which takes place gradually during exposure to atmospheric action after the composition has been used in the field. Thus the fungicidal effectiveness of zinc sulphite has been found to be much greater than that of basic zinc sulphate (zinc-Bordeaux mixture) in laboratory tests on toxicity to spore germination and in field tests on control of potato blight and pecan rosette disease. On the other hand, zinc sulphite is not only safe to use on plants but also is highly beneficial for plant growth. For example, in field tests with zinc sulphite, Bordeaux mixture (copper sulphate plus lime), zinc-Bordeaux mixture (zinc sulphate plus lime), basic copper sulphate, and basic copper sulphate chloride, zinc sulphite proved far superior as to increase of potato vine weight and increase of moisture content of the tubers.

In addition to its highly beneficial effects mentioned above, zinc sulphite has a special value for use with copper fungicides and/or for arsenical insecticides. It is known that soluble copper is very injurious to fruit and foliage and for fungicidal purposes it is necessary to use relatively insoluble forms of copper such as Bordeaux, basic copper sulphate, cuprous oxide, etc. Nevertheless soluble fractions of the copper salt may be liberated by atmospheric action and cause injury to the plant. Moreover, field tests have proved that when insoluble copper compounds are used with organic fungicides such as disodium ethylene bis-dithio-carbamate, a severe injury to foliage results. This is apparently due to interaction between the copper compounds and the organic fungicide which liberates copper ion. On the other hand, when copper is used with organic insecticides such as rotenone, pyrethrum and nicotine by-products, any copper ion liberated tends to be absorbed readily by the insecticide which is thus destabilized.

The use of zinc sulphate (without lime) to prevent such injurious effects of copper has been tried without success. This can be attributed to the high solubility of zinc sulphate. The use of lime with zinc sulphate forms a basic zinc sulphate so insoluble that it does not furnish enough zinc ion for protection against copper injury. In addition the use of alkaline materials such as lime or sodium or potassium salts is highly undesirable in the case of copper fungicides or organic insecticides or fungicides as pointed out hereinafter. A large number of other zinc salts have also been tried out to prevent the dissolving action of the organic fungicides on copper fungicides, but without success. For instance, zinc phosphate and zinc oxalate do not render protective action in this case, apparently because these types of salts are too insoluble in water to furnish the required amount of zinc ion.

Zinc sulphite is the only zinc salt which gives the desired protection against copper injury to the plant, as shown by laboratory and field tests. In the case of copper fungicides alone, the effectiveness of zinc sulphite is attributed to the fact that it furnishes a sufficient concentration of zinc ion to exert a substantial buffering effect. When copper fungicides are used together with organic fungicides or insecticides, the effectiveness of zinc sulphite is further attributed to the antagonistic action of the zinc ion against the copper ion. It seems that the zinc ion more readily reacts with the organic fungicides or insecticides and thus protects against interaction of the copper ion.

This protective action of zinc sulphite is highly beneficial in protecting plants against fungus disease when both organic and copper fungicides are needed, because it is possible to use both in one application if zinc sulphite is also used. For the control of, say, anthracnose on tomatoes, the organic fungicides, e. g. disodium ethylene bis-dithio-carbamate, are essential. For the control of, say, blight, it is necessary to use copper fungicides. Since these two materials are not compatible, it has previously been necessary to spray or dust them separately with definite intervals between applications, say ten days, to avoid copper injury and to obtain effective fungicidal action. The chief drawback of this system is that the regular interval of ten days between the applications makes the interval between copper applications twenty days, a period too long to control blight successfully. On the other hand, if the interval between alternate copper and organic applications is cut to five days so as to reduce the interval between copper applications to ten days, six treatments per month are required so that the amount of labor required is frequently beyond the ability of the farmer to provide and in any event its cost is excessive. This drawback can be overcome by a single application every ten days using copper and organics in the same spray or dust application in the presence of zinc sulphite.

Moreover, when the copper and organic fungicides are applied alternately the period between the applications is not definitely established but depends upon the experience of the grower. Also this period is purely experimental since it depends upon atmospheric conditions which govern the rate at which fungus infection spreads. Therefore, it is seen that an expert is required if these fungicides are used alternately. Furthermore, it is difficult for the farmer to maintain the proper regular sequence of and interval between frequent alternate applications, because of other demands on the available time and labor, while any farmer can apply the combination in the presence of zinc sulphite.

It is emphasized that one of the chief advantages of zinc sulphite is that it is a complete product as a buffering substance and does not require the addition of alkaline materials such as lime, as is the case with other soluble zinc salts. It has been found that in most cases alkaline materials have an adverse effect on both organic and copper fungicides. The chief disadvantages in using alkaline materials such as lime or sodium or potassium salts such as phosphates are that the effectiveness of the copper fungicides and organic fungicides is greatly reduced by alkaline materials and also that they decompose the organic insecticides, such as pyrethrum, rotenone or nicotine products which may be used in the same application. For example, when an attempt was made to neutralize soluble zinc salts with strong alkalies such as sodium or potassium hydroxide, it was found that the sodium or potassium zincate which formed actually decomposed basic copper sulphate, basic copper chloride, cuprous oxide and some other insoluble copper compounds, into cupric oxide which has practically no fungicidal value. In the case of basic copper sulphate, such decomposition is indicated by a change in color from the greenish-blue color of basic copper sulphate to the dark brown color of cupric oxide. On the other hand, the use of weak acids such as citric and tartaric is required in the use of insoluble zinc salts (such as zinc phosphate and zinc oxalate) in order to furnish zinc ion, but these acids also exert an excessive dissolving action on the copper fungicides.

Arsenicals may also cause injury to the plant. That is, arsenicals such as lead arsenate, calcium arsenate, etc., which are used for insecticidal purposes are relatively insoluble, but injury to the plant may result from soluble fractions liberated on exposure to the atmosphere. The use of zinc sulphite greatly reduces such injurious effects of arsenicals. Its effectiveness in this respect is again attributable to its buffering action as in the case of copper fungicides.

The effectiveness of zinc sulphite in protecting plants against both copper and arsenical injuries can be further explained as follows. As stated above, soluble zinc salts such as zinc sulphate can not be used because of severe injury to fruit and foliage. On the other hand, basic zinc salts such as obtained by the combination of zinc sulphate and lime are ineffective to prevent arsenical or copper injuries because soluble zinc is obtained only as a result of carbonation. High calcium lime which is commonly used for this purpose does not carbonate before five or six days under ordinary atmospheric conditions, and carbonation will simultaneously cause increased solubility in arsenicals or coppers. Arsenical or copper injuries due to the formation of soluble arsenic or copper usually occur much ahead of the liberation of zinc ion from basic zinc sulphate. Thus soluble zinc secured from basic zinc salts does not give the desired protection in many cases, whereas zinc sulphite is much more effective as explained above.

Moreover, when insoluble copper fungicides such as basic copper sulphate are used in combination with arsenicals there is an undesirable interaction between copper and arsenical that reduces the effectiveness of the copper. Zinc sulphite in this case has a two-fold action:

(a) The zinc ion reduces arsenical injury.

(b) The zinc ion protects the copper ion against interaction with soluble arsenicals and thus renders the copper more effective as a fungicide. This increased effectiveness of the insoluble copper fungicides is highly valuable since in many cases these copper fungicides have proved to be lacking in fungicidal efficiency when used in combination with arsenicals.

Thus in dust mixtures containing both copper fungicides and arsenical insecticides, zinc sulphate can not be used without lime because of injury to the plant, and the use of lime with zinc sulphate causes destabilization of the insoluble copper fungicides. Such dust mixtures are often kept in storage for a considerable period during which the fungicidal efficiency of the copper fungicide is greatly reduced by the action of the lime. Zinc sulphite, however, can be readily used in such a dust mixture without any lime. In this case zinc ion reduces the arsenical injury on one hand, and renders copper more effective on the other hand by protecting the copper ion against interaction with arsenical residue.

A further beneficial use of zinc sulphite was found to be with copper dust mixtures containing organic insecticides such as pyrethrum, rotenone, and nicotine by-products. All of these organic insecticides have a tendency to be destabilized by the liberated copper ion which they readily absorb; when, however, zinc sulphite is used, the zinc ion is more readily absorbed and the absorption of the copper ion is reduced, thus minimizing destabilizing effect and loss of effectiveness of these insecticides.

The insoluble copper fungicides in many cases require the use of supplementary materials such as wheat flour or soya flour or some other materials containing protein, fatty acids, or both to increase adherence. Some interaction between copper fungicides and protein, or copper fungicides and fatty acids may take place so as to reduce the efficiency of the copper fungicides even though the resultant copper proteinate or copper soap gives better adherence. It has been found that, in this case, zinc sulphite has a buffering action with the fatty-acid and protein compounds and helps to maintain the concentration of copper ion unchanged. This probably can be attributed to the fact that zinc ion reacts more readily with the above materials than the copper ion.

It is a well-known fact that copper fungicides may cause severe injury to fruit (apples, cherries, etc.) during electrical disturbances as a result of the ammonia and oxides of nitrogen formed in the air. When zinc sulphite is used with the copper fungicides, however, this injurious effect is minimized because of the buffering action of the zinc ion.

Cuprous oxide shows great killing power of spores in the laboratory, and yet in many cases has been found almost ineffective in the field. This change in fungicidal efficiency is probably attributable to the oxidation of cuprous into cupric oxide which actually can be observed by the change of color from red cuprous to dark brown cupric oxide. In this case zinc sulphite acts as an antioxidant and helps to protect the cuprous oxide against oxidation to cupric oxide.

The protective action of zinc sulphite against copper injuries and arsenical injuries as mentioned above is highly effective. However, the zinc sulphite has a tendency to oxidize to zinc sulphate, decreasing the amount of zinc sulphite available for protective action, and forming increasing amounts of zinc sulphate, which in turn increases the solubility of copper fungicides and arsenicals. The soluble zinc sulphate itself and the soluble copper and/or arsenical as well are injurious to fruit and foliage, and the injury may become severe when the zinc sulphite is exposed to atmospheric action for considerable periods or when the composition is held in storage as mentioned above. In such cases the protective action of the zinc sulphite may be prolonged by the use of aluminum oxide or iron oxide which greatly diminishes the oxidation of zinc sulphite to zinc sulphate and minimizes the injuries to fruit and foliage.

It should be noted that the aluminum oxide or iron oxide when used alone, i. e., without zinc sulphite, does not have beneficial value in relation to copper or arsenical injuries. Its value lies in prolonging the effectiveness of the zinc sulphite by minimizing its tendency to oxidize to zinc sulphate. This protective action of aluminum oxide, iron oxide, or a mixture of these two substances is most likely due to a buffering action, since aluminum oxide or iron oxide has a neutral reaction; that is, their suspension in water has a pH of about 7 and neither aluminum oxide nor iron oxide reacts readily with common salts, including zinc sulphite. Hence it will be understood that the oxide is not necessary but is desirable to prolong the effectiveness of the zinc sulphite after application to the plant and especially when the composition is stored for long periods before use.

The use of aluminum salts such as aluminum sulphate together with lime is well known. Aluminum salt requires the addition of alkaline materials such as lime, and the use of aluminum sulphate plus lime will not give any improvement over zinc sulphite and lime as discussed above. Furthermore, it is emphasized that zinc sulphite protects the most unstable copper fungicides, such as cuprous oxide, from conversion into cupric oxide, an effect which has not been observed in the case of any of the aluminum salts when used alone.

Summarizing, it appears that zinc sulphite is beneficial per se to plant growth and as a protection against pests, that it aids in maintaining the effectiveness of fungicides and insecticides, and that it renders very valuable protection of fruits and foliage in the following respects:

(1) Against copper injury as a result of the dissolving action on copper fungicides of—(a) atmospheric acids, (b) excessive amount of acids secreted by pathogenic fungi.

(2) Against arsenical injury.

(3) Against reaction of copper fungicides with organic fungicides which would otherwise liberate soluble copper ions.

(4) Against injury caused by the use of copper fungicides and lime-sulphur mixtures. (Note: These materials cause severe injury not only if applied as one spray, but also if applied alternately.)

(5) Against injury in the case of young apples which are very sensitive to copper injury.

(6) Against reaction of copper fungicides with protein and fatty acids, which may be used as supplementary materials in the mixture. In this case there are two functions of zinc sulphite: (1) to protect against copper injury, (2) to improve adherence of spray residue on fruit and foliage.

The amount of zinc sulphite to be used may vary considerably. It depends mainly on the amount of copper fungicide or arsenical, or on the amount of both when used in combination, but will vary according to the type of copper and/or arsenical compound used, the character of the inert diluents used in the dust or spray, and also the type of plant on which the dust or spray mixture is used. Furthermore it will be understood that the extent of protective action obtained increases progressively as the amount of zinc sulphite increases up to a maximum amount beyond which no further increase of protective action is obtained. Some degree of protective action will be obtained with only very small amounts of zinc sulphite, but as a rule the minimum amount should be about 30% of the amount of copper fungicide and/or arsenical. On the other hand, it will usually be undesirable to use more than about 60% zinc sulphite because no additional protection will be obtained above this amount. In the case of disodium ethylene bis-dithio-carbamate, it is common practice to use zinc salt with this fungicide and therefore the amount of zinc sulphite may be above 60%.

When aluminum oxide is used to prolong the protective action of the zinc sulphite, the ratio of oxide to zinc sulphite may also vary within wide limits. However, it will usually be undesirable for this ratio to exceed 1:4, as increases in the proportion of oxide beyond this ratio will not increase the protection afforded the zinc sulphite. The proportion of oxide may be decreased to as little as 1:14 and substantial benefit still obtained. The corresponding ratios in the case of iron oxide will depend on the composition of the oxide used. For example, in the case of iron oxide consisting of about one-third ferrous oxide and two-thirds ferric oxide, the ratio should be approximately the same as in the case of aluminum oxide.

The following are examples of suitable compositions which may be used with talc, clay or the like as diluents. It will be understood that when the oxide is not desired, it will simply be omitted.

(1) 3 lbs. basic copper sulphate
    1 lb. zinc sulphite
    0.25 lb. aluminum oxide
(2) 1.5 lbs. basic copper sulphate
    0.5 lb. disodium ethylene bis-dithio-carbamate
    2.0 lbs. zinc sulphite
    0.5 lb. aluminum oxide
(3) 10 lbs. basic copper sulphate
    0.75 lb. rotenone
    5–6 lbs. zinc sulphite
    1.5 lbs. aluminum oxide
(4) 3 lbs. basic copper sulphate
    3 lbs. lead arsenate
    2 lbs. zinc sulphite
    0.50 lb. aluminum oxide
(5) 3 lbs. lead arsenate (PbH AsO$_4$)
    1 lb. zinc sulphite
    0.25 lb. aluminum oxide It will be understood that the invention is not limited to the particular fungicides and insecticides named above. Thus in addition to basic copper sulphate, basic copper chloride and cuprous oxide, other copper fungicides may be used, such as basic copper oxalate and copper-alumino silicate. Similarly there may be used other organic fungicides such as ferric dimethyl dithiocarbamate, ethyl mercury phosphate and other organic insecticides such as dichloro-diphenyl-trichlorethane. The useful inorganic insecticides include, in addition to arsenicals, sodium fluoaluminate. These additional materials may be used in compositions conforming to the foregoing description and examples.

In most cases it will be desirable to mix the zinc sulphite with the other ingredients of the composition so that all may be applied to the plant simultaneously in a single dusting or spraying operation. It is possible, however, to apply the zinc sulphite to the plant separately. In this case the zinc sulphite application may either precede or follow the copper or arsenical application but the two applications should be made substantially simultaneously; i. e., no more than one or two days should be permitted to intervene if the above mentioned benefits of conjoint use are to be obtained.

It will also be understood that the proportions of the above examples are only illustrative and may vary widely under different conditions. Hence reference should be had to the appended claims for a definition of the limits of the invention.

What is claimed is:

1. A composition for application to plant foliage and fruit for the control of pests which contains zinc sulphite together with a copper fungicide.

2. A composition for application to plant foliage and fruit for the control of pests which contains zinc sulphite together with a copper fungicide and an organic fungicide.

3. A composition for application to plant foliage and fruit for the control of pests which contains zinc sulphite together with a copper fungicide and an organic insecticide.

4. A composition for application to plant foliage and fruit for the control of pests which contains zinc sulphite together with a copper fungicide and an arsenical insecticide.

5. A composition for application to plant foliage and fruit for the control of pests which contains zinc sulphite and a protective oxide selected from the group consisting of aluminum and iron oxides together with a copper fungicide.

6. A composition for application to plant foliage and fruit for the control of pests which contains zinc sulphite and a protective oxide selected from the group consisting of aluminum and iron oxides together with a copper fungicide and an organic fungicide.

7. A composition for application to plant foliage and fruit for the control of pests which contains zinc sulphite and a protective oxide selected from the group consisting of aluminum and iron oxides together with a copper fungicide and an organic insecticide.

8. A composition for application to plant foliage and fruit for the control of pests which contains zinc sulphite and a protective oxide selected from the group consisting of aluminum and iron oxides together with a copper fungicide and an arsenical insecticide.

ALEXANDER A. NIKITIN.

REFERENCES CITED

The following references are of record in the file of this patent:

UNITED STATES PATENTS

| Number | Name | Date |
|---|---|---|
| 1,626,872 | Piver | May 3, 1927 |
| 1,905,532 | Vannah | Apr. 25, 1933 |
| 2,051,910 | Sessions | Aug. 25, 1936 |
| 2,368,565 | Pearce et al. | Jan. 30, 1945 |
| 2,376,740 | Water et al. | May 22, 1945 |